United States Patent
Anderson et al.

(10) Patent No.: US 6,380,745 B1
(45) Date of Patent: Apr. 30, 2002

(54) ELECTRICAL GEOPHYSICAL APPARATUS FOR DETERMINING THE DENSITY OF POROUS MATERIALS AND ESTABLISHING GEO-ELECTRIC CONSTANTS OF POROUS MATERIAL

(76) Inventors: Dennis M. Anderson, 3990 Timberline Dr., Carson City, NV (US) 89703; William J. Ehni, 5462 Salk Rd., Carson City, NV (US) 89706

( * ) Notice: Subject to any disclaimer, the term of this patent is extended or adjusted under 35 U.S.C. 154(b) by 0 days.

(21) Appl. No.: 09/528,791

(22) Filed: Mar. 16, 2000

Related U.S. Application Data

(60) Provisional application No. 60/124,912, filed on Mar. 17, 1999.

(51) Int. Cl.$^7$ .............................. G01V 3/00; G01V 3/08; G01R 27/26; E21B 49/00
(52) U.S. Cl. ....................... 324/347; 324/323; 324/717; 324/376; 324/674; 73/152.06
(58) Field of Search ................................. 324/347, 323, 324/717, 376, 674; 73/152.06

(56) References Cited

U.S. PATENT DOCUMENTS

| | | | | |
|---|---|---|---|---|
| 3,982,177 A | * | 9/1976 | Walker et al. ............... | 324/376 |
| 4,166,244 A | * | 8/1979 | Woods et al. ................ | 324/347 |
| 4,646,000 A | * | 2/1987 | Wills .......................... | 324/674 |
| 4,907,448 A | * | 3/1990 | Givens ........................ | 324/376 |
| 5,209,104 A | * | 5/1993 | Collins et al. ................. | 73/38 |
| 5,841,282 A | * | 11/1998 | Christy et al. .............. | 324/347 |
| 5,855,721 A | * | 1/1999 | Monteiro et al. ......... | 156/274.4 |
| 5,861,750 A | * | 1/1999 | Anderson et al. ........... | 324/347 |
| 5,861,751 A | * | 1/1999 | Anderson et al. ........... | 324/347 |

OTHER PUBLICATIONS

ASTM Designation D 698–00a: Standard Test Methods for Laboratory Compaction Characteristics of Soil Using Standard Effort.
ASTM Designation D 1557–00: Standard Test Methods for Laboratory Compaction Characteristics of Soil Using Modified Effort.

\* cited by examiner

*Primary Examiner*—Glenn W. Brown
*Assistant Examiner*—Wasseem H. Hamdan

(57) ABSTRACT

The invention includes an apparatus for determining geo-electric data and the density of a porous material. A resistivity-measuring device applies an electrical current through an electrode array to that is part of a non-electrical conductive test cell that is used to measure the resistivity of the porous material that is the test cell. The test cell is a made of a rigid non-electrically conductive material and is a standard shape and dimension. The material that is the test specimen is compacted into the test cell using a standard technique so that the physical properties of the test specimen my calculated. In addition to making a set of standard physical measurement (material unit density and unit moisture content) the test cell is used to measure electrical properties of the test specimen so that a set of electrical constants can be determined for the material under test. The above data is applied with a general geophysical in-situ density equation to establish geo-electrical constants that are unique to the density characteristics of the porous material.

4 Claims, 4 Drawing Sheets

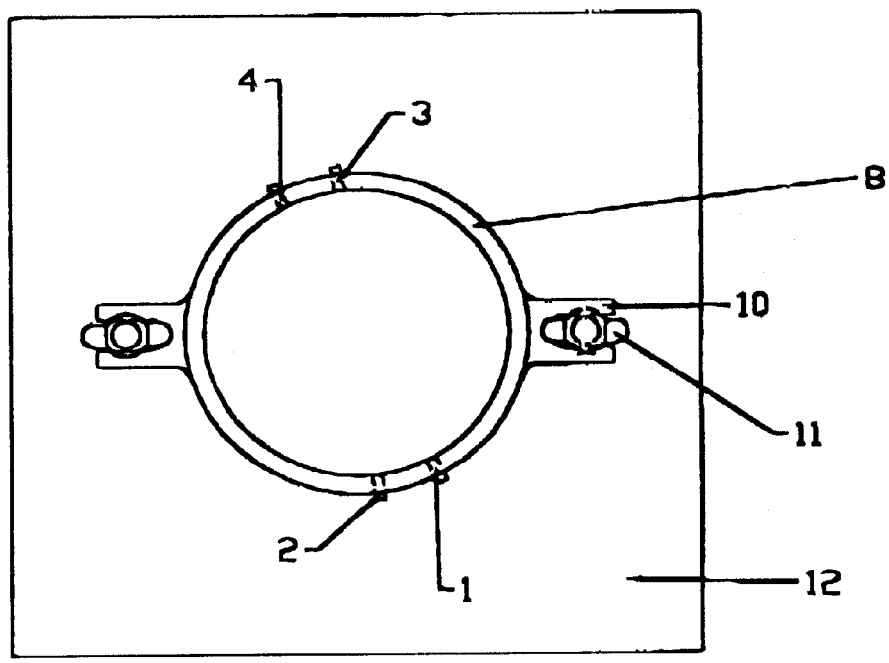
Fig. 1-A
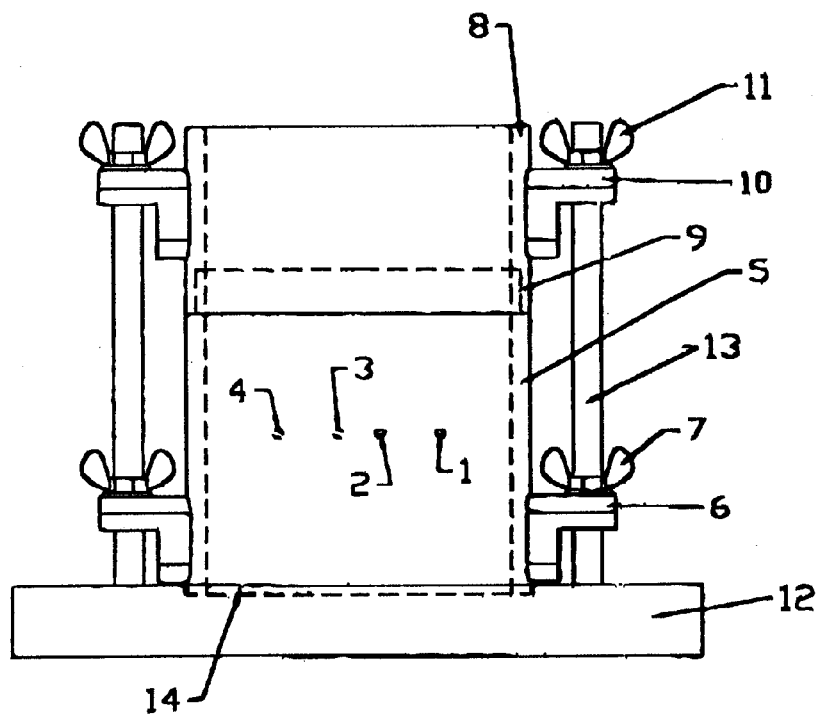
Fig. 1-B

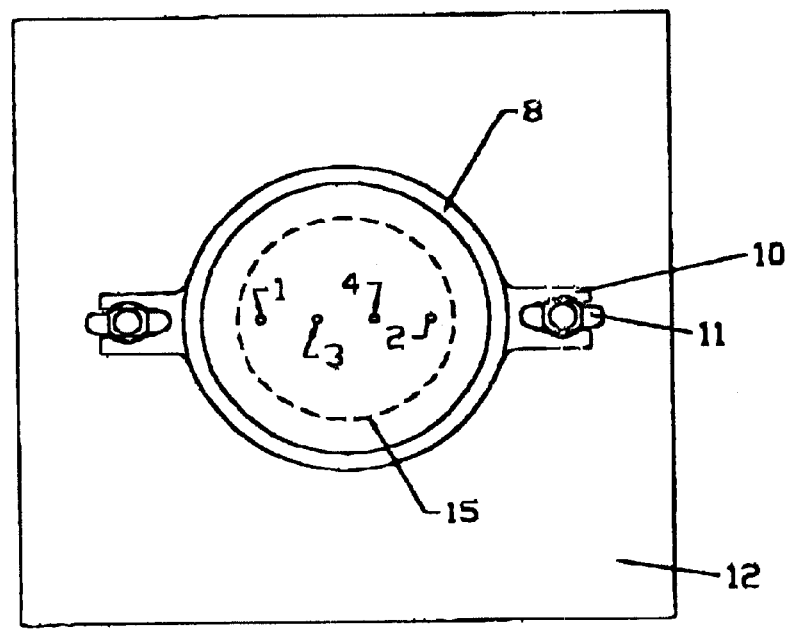
Fig. 2-A
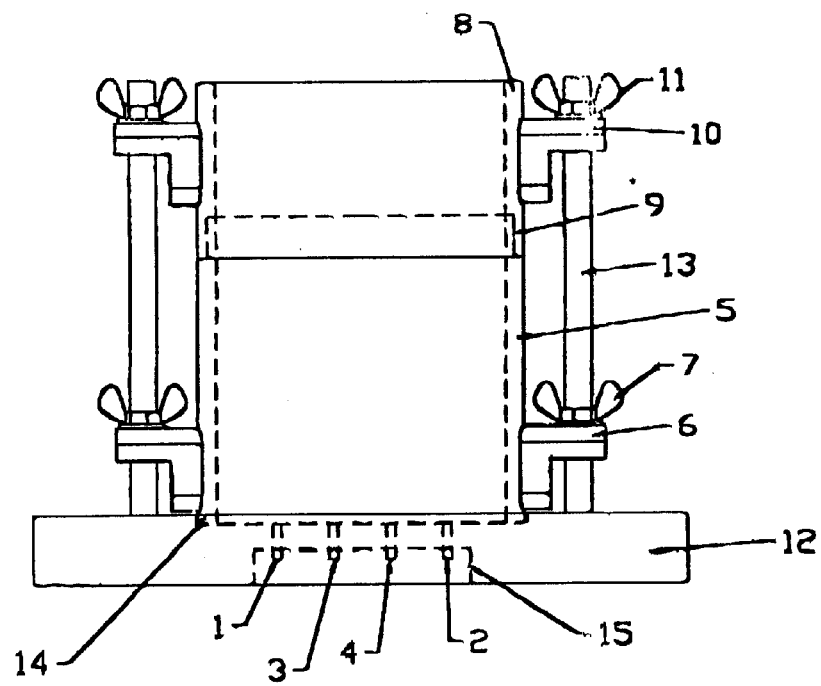
Fig. 2-B

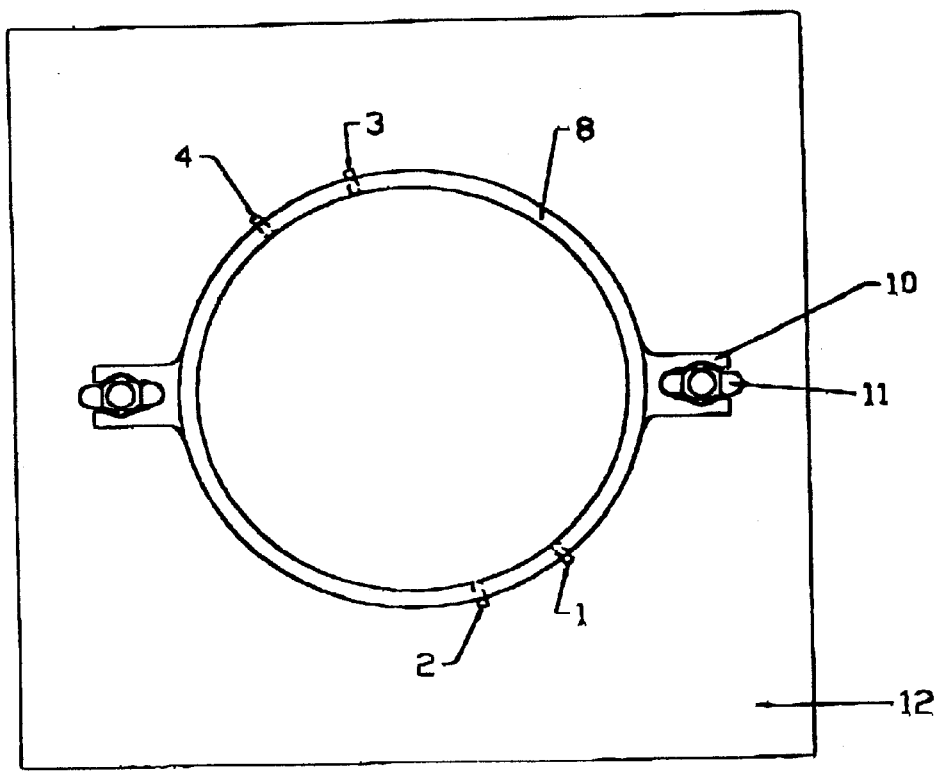
Fig. 3-A
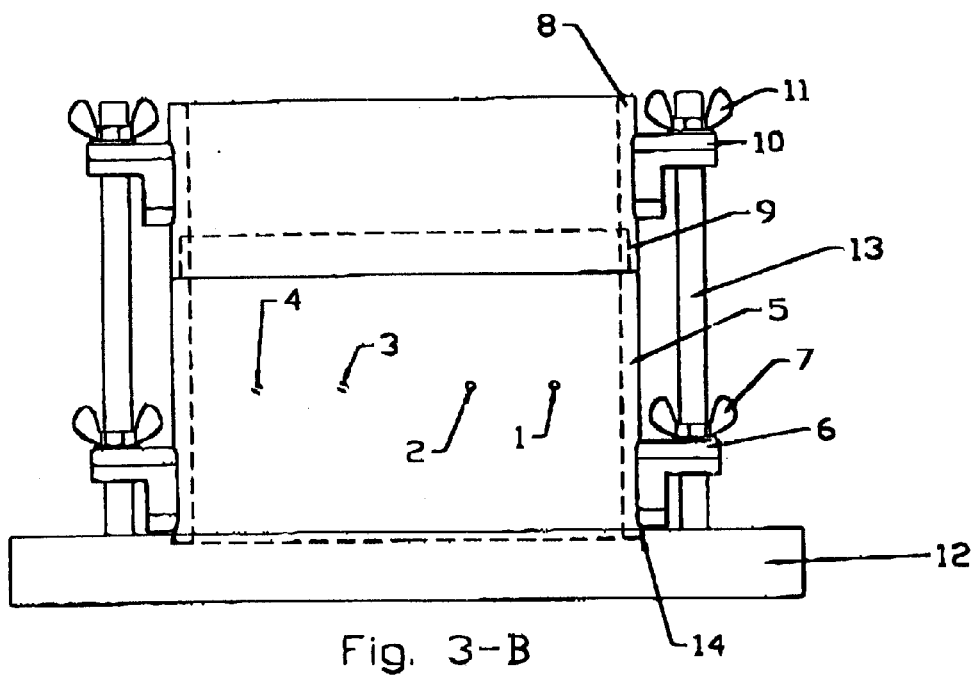
Fig. 3-B

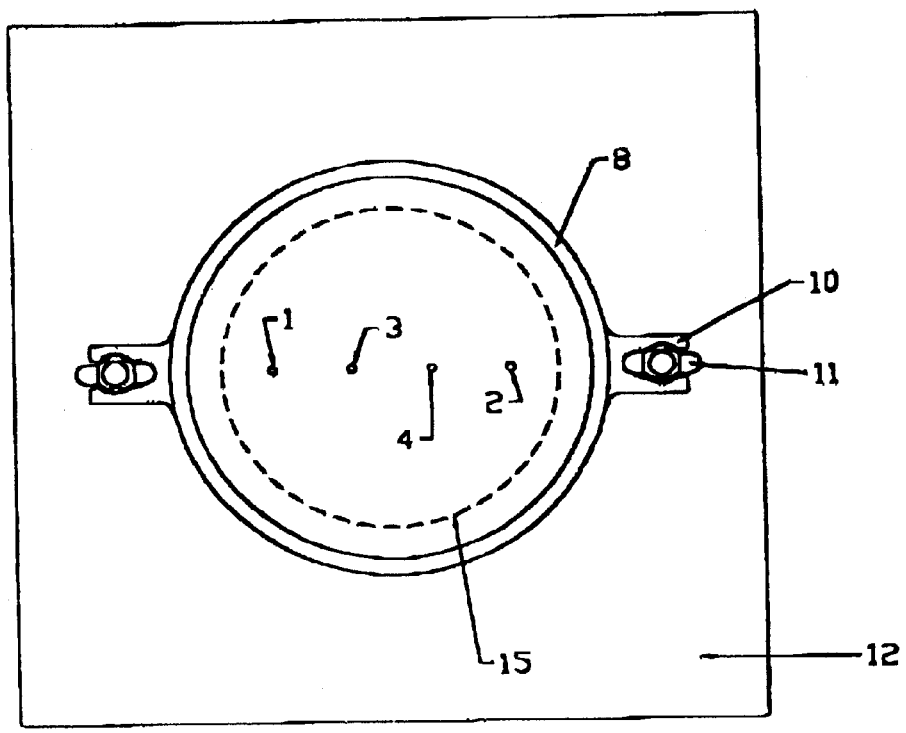
Fig. 4-A
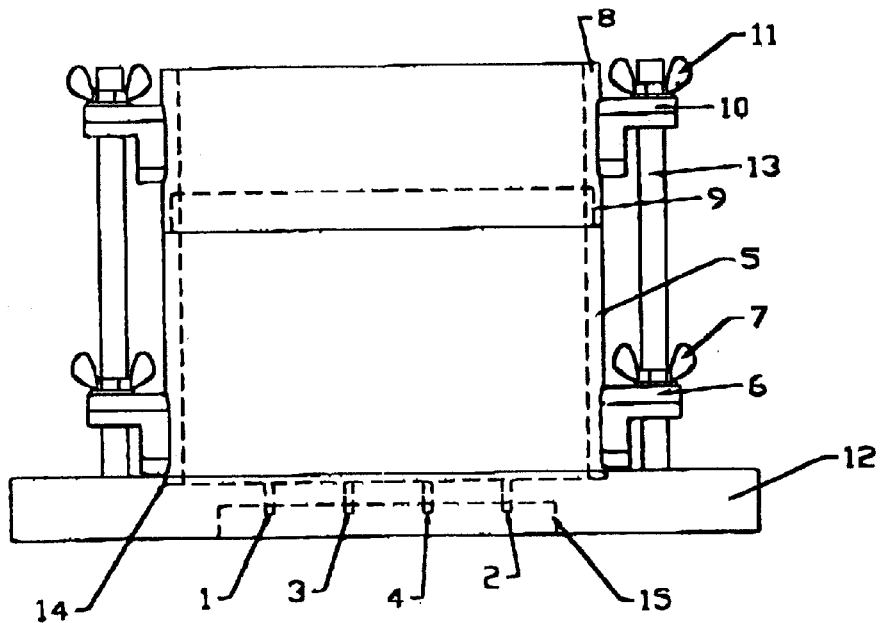
Fig. 4-B

ELECTRICAL GEOPHYSICAL APPARATUS FOR DETERMINING THE DENSITY OF POROUS MATERIALS AND ESTABLISHING GEO-ELECTRIC CONSTANTS OF POROUS MATERIAL

CROSS REFERENCES TO RELATED APPLICATIONS

This application claims priority of U.S. Patent Application Ser. No. 60/124/912 filed on Mar. 17, 1999.

BACKGROUND OF THE INVENTION

This invention relates to electrical geophysical methods and apparatus for determining the density of porous materials and establishing the porous material geo-electric constants that relate to U.S. Pat. No. 5,861,751.

The objective of the invention is to provide geo-electric density data for construction material that may be used in conjunction with a field method described in U.S. Pat. No. 5,861,751. The combined technique is used for construction quality control and quality assurance (QC/QA), as well as field documentation for submittal to a regulating authority.

Federal, state, and/or local government regulations require a QC/QA program be implemented during the construction phase of building projects that involve compacted fill earthen material. The QC/QA program involves on-site technical or engineering staff that monitor construction activities and prepare certified engineering reports as to the quality of the facility construction compared to the facility design.

In highway construction the in-situ density design specifications are typically dictated by engineering requirements or state/federal regulations. An example of a regulation that calls for a prescriptive compacted fill specification is the Nevada Department of Transportation, Standard Specifications for Road and Bridge Construction, Section 305 Roadbed Modification Subpart 305.03.05. These regulations contain minimum design criteria for the construction of a highway roadbed. The regulation states:

"After the materials have been satisfactorily mixed, the mixture shall be bladed and compacted to a ninety-five (95) percent relative maximum density as determined by Test Method No. Nev. T101. Test Method No. Nev. T102 or T103 may be used to determine the in-place density Test method to be determined by the Engineer."

BACKGROUND OF THE INVENTION

General: Existing Technologies for Measuring Density of a Porous Medium

The state-of-the art methods for measuring density include, but are not limited to, the Standard Test Method for Moisture-Density Relations of Soil-Aggregate Mixtures Using 10-lb (4.54-kg) Rammer and 18-in. (457-mm) Drop, ASTM 1557-78; or, Standard Test Method for Moisture-Density Relations of Soil-Aggregate Mixtures Using 4.4 lb (2.49-kg) Rammer and 12-in (305-mm) Drop, ASTM D698-78; or ASTM D 2922-81; or ASTM D1556. The existing technologies do not use electrical geophysical methods as a part of the operations and calculations.

Related Patents

U.S. Pat. No. 5,861,751 issued Jan. 19, 1999. The title of this patent is: ELECTRICAL GEOPHYSICAL METHODS AND APPARATUS FOR DETERMINING THE IN-SITU DENSITY OF POROUS MATERIAL. D. M. Anderson and W. J. Ehni are co-inventors for the above-mentioned patent.

U.S. Pat. No. 5,861,750 issued Jan. 19, 1999. The title of this patent is: GEOPHYSICAL METHODS AND APPARATUS FOR DETERMINING THE HYDRAULIC CONDUCTIVITY OF POROUS MATERIALS, D. M. Anderson and W. J. Ehni are co-inventors for the above-mentioned patent. The apparatus and method of acquiring the electrical resistivity field data for determining relative in-situ density of porous material uses portions of the prior art.

Applicable Background Art

Development of an electrical geophysical method and apparatus for determining the in-situ density of porous materials at the earth's surface utilizes two primary principles of applied geophysics. Both of the geophysical principals had their origin in the petroleum industry and were not considered, assessed, examined, or adapted for use for geotechnical engineering until Anderson and Ehni recognized their potential, conducted research to assess adaptation of the principals, and developed the invention that is presented herein.

The first geophysical principal is based on work by Conrad and Marcel Schlumberger (1930) who developed a system of measuring the resistivity of surface rocks with electrodes deployed on the surface. The electrode spacing was typically 10's of 100's of feet and the objective of the investigation was to assess rock formation contact zones or geological structures, such as faulting and folding in deep subsurface zones. They used the subsurface zone variations in resistivity to interpret gross geologic structural phenomena. They later applied this technology to evaluating well bores drilled for petroleum exploration.

The second geophysical principal uses G. E. Archie's 1941 work. Archie presented his work in 1942 in a paper entitled *The Electrical Resistivity Log as an Aid in Determining Some Reservoir Characteristics*. Archie determined porosities of various materials using resistivity measurements. Mathematical formulas that G. E. Archie derived, and other relevant mathematical formulas that have been adapted for use in the invention, are outlined in the DESCRIPTION OF THE PREFERRED EMBODIMENTS.

By combining these two petroleum exploration and production industries principles with modified geotechnical engineering equations for relative density, a new, accurate method has been developed for determining the geoelectric constants of a standard sample of porous materials as geo-electric tested ASTM 698.

Earlier researchers never provided a process or method for developing lab data that relates electrical resistivity to soil density because their focus was directed toward physical soil characteristics, not requiring electrical data for geotechnical engineering measurements and calculations. U.S. Pat. No. 5,861,751 combines the art of electrical geophysics with geotechnical engineering. Prior geophysical art includes the Wenner Electrode Array, which applies the Schlumberger theory by utilizing four electrodes that are spaced on the surface of the earth at equal distances. The distance between each electrode is commonly referred to as the "a" spacing. In general, the depth of investigation is directly related to the electrode separation. J. J. Jakosky, (1950), discusses the depth of investigation, and notes that the theoretical depth of investigation should be equal to the "a" spacing in a Wenner Array for a homogeneous medium.

In other electrode arrays, the depth of investigation can be as low as 20% of the length of the current electrode spacing from one end of the array to the other. The objective of applying the Wenner Electrode Array was to assess gross geologic features in the subsurface. The surface spacing for this purpose is 10's of 100's of feet, and the analysis yields an understanding of geologic structures in the subsurface. The key element in a typical investigation using the Wenner Electrode Array is the variation in the resistivity numbers. A single raw number alone would not allow interpretation of geologic structural phenomena, and is considered useless when out of context. A single resistivity number would not enable the assessment of geologic structural changes in the subsurface.

Anderson and Ehni chose a relatively small distance for the electrode separation in the Wenner Array installed in a nonconductive standard density mold. The objective of Anderson and Ehni's work is to establish a set of geo-electric constants that are unique to a standard sample of material (SSM). These geo-electric constants that were established for the SSM are then used to calculate the in-situ density of the geotechnically similar porous material under test (PMUT). Using unprecedented short electrode separation installed in a standard density mold, Anderson and Ehni were able to measure a unique set of geo-electric properties of soil products.

In-situ density calculations using electrical geophysics were developed by Anderson and Ehni in 1996 and covered under U.S. Pat. No. 5,861,751. They use resistivity measurements and porosity calculations as developed by G. E. Archie, combined with a formation factor or constant. These formation and/or solution factors are empirically derived through experimentation and testing for repeatability.

The following professional papers were considered in the development of the present inventions:

Archie, G. E., The Electrical Resistivity Log as an Aid in Determining Some Reservoir Characteristics, Transaction of the American Institute of Mining and Metallurgical Engineers, Vol. 146, 1942

Cernica, John N. Geotechnical Engineering: Soil Mechanics, John Wiley & Sons, Inc., 1995

Hunt, Roy E., Geotechnical Engineering Investigation Manual, McGraw-Hill Book Company, 1984

McCarthy, David F., Essentials of Soil Mechanics and Foundations, Second Edition, Basic Geotechnics, Reston Publishing Company, Inc., 1982

Parasnis, D. S., Principles of Applied Geophysics, Fourth Edition, Published by Chapman and Hall, Ltd., New York, N.Y., 1986

Schlumberger C., and Scblumberger M.; Depth of investigation attainable by potential methods of electrical exploration . . . ; AIME Technical Publication No. 315; 1930

Schlumberger C., Scilumberger M., Leonardon E. D.; Electrical Coriing: a Method of Determining Bottom-hole data by Electrical Measurements.; Transactions of the AIME; Technical Publication No. 462; 1932

Vingoe, P., Electrical Resistivity Surveying, ABEM Geophysics & Electronics, Geophysical Memorandum 5/72; 1972

Wyllie, M. R. J. and Rose, Walter D., Some theoretical Considerations Related to the Quantitative Evaluation of the Physical characteristics of Reservoir Rock from Electrical Log Data, Gulf Research and Development Co., AIME Petroleum Branch, 1949

SUMMARY OF THE INVENTION

In U.S. Pat. No. 5,861,751, Dennis Anderson, P. E. and Bill Ehni have developed an efficient tool for measuring the in-situ density of porous materials. The present invention measures the geophysical properties of a standard sample material (SSM) using the testing apparatus and procedures, i.e. ASTM D1557 or ASTM D698, made of non-electrically conductive material and having a set, or sets, of electrodes installed for making geo-electrical measurements during the standard procedure. The resistivity measurements in conjunction with the moisture and density data are then used in the equations to empirically derive the geo-electric constants that are used in U.S. Pat. No. 5,861,751.

Front-end geotechnical analysis is an industry standard practice for construction projects that use earthen materials. The invention uses a general geophysical density equation (Anderson & Ehni 1996) that requires a set of empirically derived constants, The empirically derived constants that are used in the calculations for determining the in-situ density of the earthen construction materials are established for each soil type product that is scheduled for use in the construction. For each homogenous porous material a set of constants are established for use in the general geophysical-in-situ density equation.

The empirically derived constants are established by conducting pre-construction geotechnical tests. A series of lab tests using ASTM D698 or ASTM D1557 procedures are performed to establish an acceptable confidence level for repeatability for actual construction use with a given porous material that is considered geotechnically homogeneous. Once the constants are established, only two general geophysical-in-situ density equation variables, R and S, are field measured at each test site during the construction phase of the project. The following discussion compares the existing technology with the invention.

The present invention, when used in conjunction with U.S. Pat. No. 5,861,751 techniques, enables fast, efficient, and accurate testing of in-situ density of porous mediums. The field measurements can be performed during the foundation construction phase of building projects.

The new testing technology is the first application to employ electrodes in a standard proctor mold for deriving geoelectric constants. The invention's primary advantage over existing technology is that it enables the fast field use of U.S. Pat. No. 5,861,751 which does not use a nuclear source, but still offer a high level of efficiency for QC/QA work and testing related to soil in-situ density The invention has significant advantages over conventional QC/QA and environmental technology. The invention measures soil geo-electric density with electrical geophysical

DESCRIPTION OF THE DRAWINGS

Reference Numerals in the Drawings are as follows:
1. Current Electrode
2. Current Electrode
3. Potential Electrode
4. Potential Electrode
5. Non-electrically Conductive Primary Cylinder Cell
6. Non-electrically Conductive Primary Cylinder Cell Fixing Arm
7. Wing Nut
8. Non-electrically Conductive Top Sleeve
9. The notch cut-out in the top of the Non-electrically Conductive Primary Cylinder Cell and the bottom of the Non-electrically Conductive Top Sleeve so that the Top Sleeve fits over the Primary Cylinder Cell
10. Non-electrically Conductive Top Sleeve Fixing Arm
11. Wing Nut
12. Non-electrically Conductive Base Part
13. Bolt Non-electrically Conductive Base Part Non-electrically Conductive Base Part 14. Notch cutout in the top of the Base Part where the Non-electrically Conductive Primary Cylinder Cell is seated when the Base Part and the Primary Cylinder Cell are fastened together.
15. Notch cutout in the bottom of the Base Part such that the Wenner Array Electrodes in the Base Part are accessible for electronic wiring.

The Drawing consists of four sheets, with each sheet having two figures. Drawing one has FIGS. 1-A and 1-B and shows the Non-electrically Conductive Primary Cylinder Cell, the Non-electrically Conductive Top Sleeve, and the Non-electrically Conductive Base Part for the four-inch mold with a Di-pole Di-pole electrode array in the Non-electrically Conductive Primary Cylinder Cell.

Drawing two has FIGS. 2-A and 2-B and shows the Non-electrically Conductive Primary Cylinder Cell, the Non-electrically Conductive Top Sleeve, and the Non-electrically Conductive Base Part for the four-inch mold with a Wenner electrode array in the Non-electrically Conductive Base Part.

Drawing three has FIGS. 3-A and 3-B and shows the Non-electrically Conductive Primary Cylinder Cell, the Non-electrically Conductive Top Sleeve, and the Non-electrically Conductive Base Part for the six-inch mold with a Di-pole Di-pole electrode array in the Non-electrically Conductive Primary Cylinder Cell.

Drawing four has FIGS. 4-A and 4-B and shows the Non-electrically Conductive Primary Cylinder Cell, the Non-electrically Conductive Top Sleeve, and the Non-electrically Conductive Base Part for the six-inch mold with a Wenner electrode array in the Non-electrically Conductive Base Part.

DESCRIPTION OF THE PREFERRED EMBODIMENTS

Several observations have been used to formulate the mathematics, equipment and process for using electrical geophysics to measure the density of a porous medium.

The invention involves a process and apparatus requiring specific measurements using equipment consisting of a resistivity meter and a series of electrodes (in groups of four) set up in an array within a proctor mold during ASTM 698. The process directly measures the electrical resistivity of a porous medium within a proctor mold, such as ASTM D1557 or ASTM D698 during the test procedure.

Electrical resistivity data are established in the lab and are subsequently used to calculate the in-situ density of the porous materials at the time of field investigation. The test methodology includes a set of standard operational techniques for acquiring the electrical resistivity data, which are used to quantify the porosity of the porous while a standard ASTM D698 or ASTM D1557 is in progress.

The process involves measuring the resistivity of the porous medium, measuring the resistivity of the pore filling fluid; empirically deriving a formation factor constant and a density constant based on the physical properties of the pore filling fluid and the porous medium. The geo-electric constants that are established in the lab tests are then used in measuring the resistivity of the saturated, or partially saturated, porous medium in-situ, The in-situ density of the material is directly related to its porosity and by measuring the in-situ porosity of the porous medium the in-situ density can be calculated using a general geophysical-in-situ density equation (Anderson & Ehni, 1996)

One of the advantages of the invention is that the applied geophysical techniques, i.e. field electrical resistivity measurements, will provide quick, efficient and reliable geo-electric constants and density data and geo-electric constants. The objective of the invention is to provide the geo-electric constants for a standard sample that are subsequently employed in field tests as per U.S. Pat. No. 5,861,751 for immediate construction material characteristic data (i.e. in-situ density data) that may be used for construction quality control and quality assurance, as well as field documentation for submittal to a regulating authority.

The significance of the testing procedure lies in its ability to accurately develop SSM geo-electric constants that can be employed in U.S. Pat. No. 5,861,751 to measure the in-situ density of a volume of installed material.

The electrode apparatus is comprised of a non-conductive standard density mold with at least four electrodes, which are connected to a resistivity meter. The electrodes are all required to be in good contact with the surface of the material that is being tested.

Geophysical formulas are employed with the invention for calculating the in-situ density of porous mediums. The formulas are listed in the sequence that they are used in the following section:

The invention determines the in-situ density porous material by:

1. Measuring the resistivity of the porous medium and the pore filling fluid. The resistivity measurements are obtained by expanding on a technique first described by Schlumberger. The process is not dependent on the type of electrode array used; however, the most convenient one is the Wenner electrode array The depth of investigation for the Wenner Array is equal to the "a" spacing.
2. Calculating the porosity of the porous medium by expanding on the theories initially developed G. E. Archie.
3. Calculating the in-situ density using the relationship of porosity to in-situ density using modified conventional volume/density equations.

Using the work of Wenner, Archie and one of two sets of mathematics developed by Anderson-Ehni this process can be summarized as follows:

1. Measurement of the bulk resistivity of the porous medium and the pore filling fluid (i.e.

$$\sigma_a = 2\Pi A_m \left(\frac{\Delta V}{I}\right) \qquad \text{(equation 1)}$$

permeant): Wenner Array, 1972, apparent resistivity:
Where:
$\sigma_a$=Resistivity of the medium at spacing distance "A" in Ohm-meters
$A_m$=Spacing distance of electrodes in meters
V=Volts
I=Current (amps)

Or the measurement of the apparent resistivity of the porous medium and the pore filling fluid (i.e. permeant) using a dipole-dipole configuration. Parasnis, D. S. 1986, apparent resistivity for dipole-dipole configurations. In a dipole-dipole configuration there are two sets of electrodes. One electrode set is the current-electrode-set and the other electrode set is the potential-electrode-set. The electrical fields of a current dipole in the radial and azimuthal directions as well as parallel and perpendicular to the dipole are immediately obtained from one of the following formulae; axial configuration, radial, parallel, perpendicular, or equatorial.

All of theses formulae are valid only if the distance between the current-electrode-set and the potential-electrode-set is greater than the distance between the two electrodes that make up the current-electrode-set as well as the distance between the two electrodes that make up the potential-electrode-set. The dipole-dipole equatorial equation is presented below:

$$\rho_{eq} = \frac{2\pi r^3}{(AB)(MN)} \Delta \frac{V}{I} \quad \text{(equation 2)}$$

Where:
 $\rho_{eq}$=Apparent Resistivity of the medium in Ohm-meters
 r=The distance between the current-electrode-set and the potential-electrode-set
 AB=Distance between the two current electrodes
 MN=Distance between the two potential electrodes
 $\Delta V/I$=Change in Volts ($\Delta V$) over the Current (I), i.e. the measured electrical resistance in ohms 2. Calculate the porosity of the medium by rearranging Archie's equations, which relate total resistivity (R) to a product of the resistivity of the permeant (Rw), the porosity ($\phi$), the percentage of saturation (S), and the resistivity of the formation (a): Archie, 1942, general form equation:

$$R = aR_w\Phi^m S^n \quad \_ \quad \Phi = \sqrt[m]{\frac{aR_w}{RS^n}} \quad \text{(equation 3)}$$

Where:
 $\phi$=Porosity in a decimal form.
 $R_W$=Resistivity of permeant (water plus dissolved salts or chemical constituents) in Ohms as derived through physical measurements and calculations using equation 1; $R_W=\sigma_a$ for the permeant when testing the resistivity of the pore filling fluid.
 R=Observed resistivity (e.g. porous material) in Ohms as derived through physical measurements and calculations using equation 1; R=$\sigma_a$ for the porous material when testing the resistivity of the porous material. p2 S=Percent of the pore volume filled with permeant, (the number is typically represented in percentage form, i.e., X %)
 n=Variable, usually very close to 2.0, for water saturation over 30% and increases to 10 for water saturation less than 1%.
 a=Formation factor typically varying between 0.47 and 2.00; unitless, Empirically derived through side-by-side testing with contemporary technology (i.e. four Flexible Wall In-situ density tests compared to four invention tests from the same sample sites, under the same conditions during a test period).
 m=Cementation exponent which usually varies from 1.3 to 2.0.

3. VOID RATIO DENSITY

Calculate the in-situ density by utilizing the relationship of porosity and in-situ density using conventional volume/density equations that were adapted for the new process. The following sequence of equations are used to derive the void ratio in-situ density of porous material using the relationships of void ratios:

$$D_v = \frac{(e_{max} - e)}{(e_{max} - e_{min})} \times 100 \times C_v \quad \text{(equation 4)}$$

Where:
 $D_v$=Void Ratio Density of in-situ porous material
 $e_{max}$=void ration of the soil in loosest state, also defined as $V_v/V_s$ which represents the volume of voids divided into the volume of solids in a unit sample
 $V_v$=volume of voids in a unit sample
 $V_s$=volume of solid material in a unit sample
 $e_{min}$=void ratio of the soil in densest state; also defined as Vv/Vs which represents the volume of voids divided into the volume of solids in a unit sample
 e=void ratio for in-situ state
 $C_v$=Empirically derived unitless constant that is related to the $e_{max}$ and $e_{min}$ for a given soil product type. Empirically derived through side-by-side testing with contemporary technology. Once $C_v$ is established for a given porous material, then that constant is used routinely for subsequent in-situ density of the soil type.

$$\Phi = \frac{e}{1+e} \Longrightarrow e = \frac{\Phi}{1-\Phi} \quad \text{(equation 5)}$$

and:
 Where;
  $\phi$=porosity, as determined by using equations 1 and 2
Therefore:
 The general form of the geophysical-in-situ density equation is derived by combining equations 1 or 2 with 3, 4, and 5 into a single equation (e.g. equation 6) that yields a in-situ density, The geophysical-in-situ density equation using void ratios is as follows; Anderson & Ehni, 1996, geophysical in-situ density, synthesis No. 1:

$$D_v = \left(\frac{e_{max} - \frac{\Phi}{1-\Phi}}{e_{max} - e_{min}}\right) \times 100 \times C_v \quad \text{(equation 6)}$$

RELATIVE DENSITY

A second set of mathematics can also be used in replacement of the Anderson & Ehni, 1996 geophysical in-situ density, synthesis No. 1. The in-situ relative density may be derived using mathematics that relates the porosity to the soil density. Equations 1 and 2 are employed as above. However void ratios are difficult to obtain (they require specificity gravity $G_s$ of the soil), therefore the equation generally used in geotechnical engineering to derive relative density, $D_r$, is $$D_r = \left(\frac{\rho_f - \rho_{min}}{\rho_{max} - \rho_{min}}\right)\left(\frac{\rho_{max}}{\rho_f}\right) \times 100 \times C_\rho \quad \text{(equation 7)}$$

listed below, along with geophysical adaptations.
 Where:
  $D_r$=Relative Density of in-situ porous material
  $\rho_{max}$=maximum laboratory density (or unit weight)
  $\rho_{min}$=minimum laboratory density (or unit weight)
  $\rho_f$=field or in-situ density (or unit weight)
  $C_\rho$=Empirically derived unitless constant that is related to the $\rho_{max}$ and $\rho_{min}$ for a given soil product type. Empirically derived through side-by-side testing with contemporary technology. Once $C_\rho$ is established for a given porous material type, then that constant is used routinely for subsequent in-situ density of the porous material type. and:

$$\Phi = I\frac{\rho_f}{G_s} - \rho_f = (1-\Phi)G_s \qquad \text{(equation 8)}$$

Where:
 φ=porosity, as determined by using equations 1 and 2
 $G_s$=Specific gravity, which equals the weight of the solids divided into the volume of the solids times the unit weight of water: $W_g/V_{s\gamma w}$ Therefore:

The general form of the geophysical-in-situ density equation is derived by combining equations 1 or 2, with 3, 7, and 8 into a single equation (e.g. equation 9) that yields a in-situ density number, The geophysical-in-situ density equation using soil density is as follows; Anderson & Ehni, 1996, geophysical in-situ density, synthesis no. 2.

$$D_r = \left(\frac{(1-\Phi)G_s - \rho_{\min}}{\rho_{\max} - \rho_{\min}}\right)\left(\frac{\rho_{\max}}{(1-\Phi)G_s}\right) \times 100 \times C_\rho \qquad \text{(equation 9)}$$

What is claimed is:

1. An apparatus for determining geo-electric data and the density of porous material that uses a resistivity-measuring device which applies an electrical current through an electrode array that is part of a non-electrical conductive test cell, which is used to measure the electrical properties of the porous material that is in the test cell, the said apparatus comprising the following equipment;

a rigid cylindrical soil testing cell that is used for testing the physical and electrical properties of soil material, that is made out of an electrical insulator material, that contains four electrodes in a dipole-dipole configuration, the cell is manufactured in three separate parts that fit together and are connected with fasteners, after which the soil is place into the cylindrical soil testing cell and compacted, during the compaction of soil in the cell, the compacted soil weight is measured and the water content is measured such that the compacted dry density of the soil can be calculated by volume to mass relationship and the electrical properties of the compacted soil can be measured during the testing procedure which are then used to determine a set of electrical soil constants for the material under test, the primary cylindrical cell part is 4.584 inches tall and has an inside diameter of 4.0 inches with a tolerance of plus or minus 0.016 inches, such that the volume of the primary cylindrical cell part is one thirtieth (1/30) of a cubic foot, plus or minus 0.0004 cu. ft., the cylinder wall thickness is a minimum of one quarter inch thick, the electrodes are one eighth inch (1/8") in diameter and are located around the circumference of the primary cylindrical cell art with each of the electrodes being an equal distance from the top of primary cylindrical cell part top the bottom of the primary cylindrical cell part, electrodes are grouped together in two pairs, and the distance between the two electrodes that constitutes an electrode pair is 0.787 inches, the center of the electrode pairs are 180 degrees part around the circumference of the primary cylindrical cell part, and the electrodes are manufactured in the primary cylindrical cell part so the each electrode is flush with the inside of the primary cylindrical cell part, the primary cylindrical cell part is fastened to the base part by wing nuts and fixing arms during the soil compaction process, the second of the three parts that make up the rigid cylindrical soil testing cell is a cylindrical sleeve, which is 2.0 inches in length that is known as the top sleeve, and has an inside diameter of 4.0 inches and a cut-away connection notch such that the top cylinder part fits over the primary cylinder part by five eights of and inch (5/8"), and is fastened to the primary cell part and to the base part by wing nuts and fixing arms during the soil compaction process, and the cylinder part is removed from the primary cylinder part and the soil is leveled off at the top of the cell so that the standard volume of the cell without the top sleeve on it is one thirtieth (1/30) of a cubic foot, plus or minus 0.0004 cu. ft., the third part of the cylindrical soil testing cell is the base, the base is a flat insulator material that is nine inches by nine inches by one inch, and has two six inch long by 3/8 inch diameter bolts extending up perpendicular from the base part, a cylindrical notch is located in the center of the base part that is one sixteenth of an inch larger than the outside diameter of the primary cylindrical cell part and is one eight of and inch deep, the bolts are located 180 degrees apart on the base at a center-to-center distance of six inches and the bolts are permanently fixed to the base so that the bottom of the base is flat and the bolts extend up form the tip of the base six inches, and the primary cylindrical cell fits between the bolts and in the cylindrical notch, and the bolts along with wing-nuts and fastening arms on the primary cylindrical cell part are used to fasten both the primary cylindrical part and the cylindrical sleeve to the base part during compaction testing.

2. An apparatus for determining geo-electric data and the density of a porous material that uses a resistivity-measuring device which applies an electrical current through an electrode array that is part of a non-electrical conductive test cell, which is used to measure the electrical properties of the porous material that is in the test cell, the said apparatus comprising the following equipment;

a rigid cylindrical soil testing cell that is used for testing the physical and electrical properties of soil material, that is made out of an electrical insulator material, that contains four electrodes in a Wenner array configuration (a linear set of four electrodes that are equally space), the cell is manufactured in three separate parts that fit together and are connected with fasteners, after which the soil is placed into the cylindrical soil testing cell and compacted, during the compaction of soil in the cell, the compacted soil weight is measured and the water content is measured such that the compacted dry density of the soil can be calculated by volume to mass relationship and the electrical properties of the compacted soil can be measured during the testing procedure which are then used to determine a set of electrical soil constants for the material under test, the primary cylindrical cell part is 4.584 inches tall and has an inside diameter of 4.0 inches with a tolerance of plus or minus 0.016 inches, such that the volume of the primary cylindrical cell part is fastened to the base part by wing nuts and fixing arms during the soil compaction process, the second of the three parts that make up the rigid cylindrical soil testing cell is cylindrical sleeve, which is 2.0 inches in length that is known as the top sleeve, and has an inside diameter of 4.0 inches and a cut-away connection notch such that the top cylinder part fits over the primary cylinder part by five eights of an inch (⅝"), and is fastened top the primary cell part and to the base part by wing nuts and fixing arms during the soil compaction process, and the top cylinder part is removed from the primary cylinder part and the soil is leveled off at the top of the cell so that the standard volume of the cell without the top sleeve on it is one thirtieth (1/30) of a cubic foot, plus or minus 0.0004 cu. ft., the third part of the cylindrical soil testing cell is the base, the base is a flat insulator material that is nine inches by nine inches by one inch, and has two six inch long by ⅜ inch diameter bolts extending up perpendicular from the base part, a cylindrical notch is located in the center of the base part that is one sixteenth of and inch larger than the outside diameter of the primary cylindrical cell part and is one eight of an inch deep, the bolts are located 180 degrees apart on the base at a center-to-center distance of six inches and the bolts are permanently fixed to the base so that the bottom of the base is flat and the bolts extend up from the top of the base six inches, and the primary cylindrical fits between the bolts and in the cylindrical notch, and the bolts along with wing-nuts and fastening arms on the primary cylindrical sleeve to the base part during compaction testing, the electrodes are one eighth inch (⅛") in diameter and are located in the base part along a line that constitutes a diameter line across the cylindrical notch in the base part and each electrode is 0.787 inches apart such that center of the Wenner array is incident with the center of the primary cylindrical cell part when the primary cylindrical cell part is fixed to the base, the electrodes are manufactured into the base part so that each electrode is flush with the flat surface of the cylindrical notch in the base part, the base part has a cut-out notch in the bottom that is in the center of the base part and is three inches in diameter and one half inch deep, the Wenner array electrodes extend into the notch such that electrical connectors can be attached to the electrodes.

3. An apparatus for determining geo-electric data and the density of a porous material that uses a resistivity-measuring device which applies an electrical current through an electrode array that is part of a non-electrical conductive test cell, which is used to measure the electrical properties of the porous material that is in the test cell, the said apparatus comprising the following equipment;
   a rigid cylindrical soil testing cell that is used for testing the physical and electrical properties of soil material that is made out of an electrical insulator material, that contains four electrodes in a dipole-dipole configuration, the cell is manufactured in three separate parts that fit together and are connected with fasteners, after which the soil is placed into the cylindrical soil testing cell and compacted, during the compaction of soil in the cell, the compacted soil weight is measured and the water content is measured such that the compacted dry density of the soil can be calculated by volume to mass relationship and the electrical properties of the compacted soil can be measure during the testing procedure which are then used to determine a set of electrical soil constants for the material under test, the primary cylindrical cell part is 4.584 inches tall and has an inside diameter of 6.0 inches with a tolerance of plus or minus 0.026 inches, such that the volume of the primary cylindrical cell part is 1/13.333 of a cubic foot, plus or minus 0.0009 cu. ft., the cylinder wall thickness is a minimum of one quarter inch thick, the electrodes are one eighth inch (⅛") in diameter and are located around the circumference of the primary cylindrical cell part with each of the electrodes being and equal distance form the top of primary cylindrical cell part to the bottom of the primary cylindrical cell part, electrodes are grouped together in two pairs, and the distance between the two electrodes that constitutes an electrode pair is 1.181 inches, the center of the electrode pairs are 180 degrees part around the circumference of the primary cylindrical cell part, and the electrodes are manufactured into the primary cylindrical cell part so the each electrode is flush with the inside of the primary cylindrical cell part, the primary cylindrical cell part is fastened to the base part by wing nuts and fixing arms during the soil compaction process, the second of the three parts that make up the rigid cylindrical soil testing cell is cylindrical sleeve, which is 2.0 inches in length that is known as the top sleeve, and has an inside diameter of 6.0 inches and a cut-away connection notch such that the top cylinder part fits over the primary cylinder cell part by five eighths on an inch (⅝"), and is fastened to the primary cell part and to the base part by wing nuts and fixing arms during the soil compaction process, and the top cylinder part is removed from the primary cylinder part and the soil is leveled off at the top of the cell so that the standard volume of the cell without the top sleeve on it is 1/13.333 of a cubic foot, plus or minus 0.0009 cu. ft., the third part of the cylindrical soil testing cell is the base, the base is a flat insulator material that is eleven inches by eleven inches by one inch, and has two six inch long by ⅜ inch diameter bolts extending up perpendicular form the base part, a cylindrical notch is located in the center of the base part that is one sixteenth of and inch larger that the outside diameter of the primary cylindrical cell part and is one eight of an inch deep, the bolts are located 180 degrees apart on the base at a center-to-center distance of eight inches and the bolts are permanently fixed to the base so that the bottom of the base is flat and the bolts extend up from the top of the base six inches, and the primary cylindrical cell fits between the bolts and in the cylindrical notch, and the bolts along with wing-nuts and fastening arms on the primary cylindrical cell part are used to fasten both the primary cylindrical part and the cylindrical sleeve to the base part during compaction testing.

4. An apparatus for determining geo-electric data and the density of a porous material that uses a resistivity-measuring device which applies an electrical current through and electrode array that is part of anon-electrical conductive test cell, which is used to measure the electrical properties of the porous material that is in the test cell, the said apparatus comprising the following equipment;
   a rigid cylindrical soil testing cell that is used for testing the physical and electrical properties of soil material, that is made out of an electrical insulator material, that contains four electrodes in a Wenner array configuration (a linear set of four electrodes that are equally spaced), the cell is manufactured in three separate parts that fit together and are connected with fasteners, after which the soil is placed into the cylindrical soil testing cell and compacted, during the compaction of soil in the cell, the compacted soil weight is measured and the water content is measured such that the compacted dry density of the soil can be calculated by volume to mass relationship and the electrical properties of the compacted soil can be measured during the testing procedure which are then used to determine a set of electrical soil constants for the material under test, the primary cylindrical cell part is 4.584 inches tall and has an inside diameter of 6.0 inches with a tolerance of plus or minus 0.026 inches, such that the volume of the primary cylindrical cell part is 1/13.333 of a cubic foot, plus or minus 0.0009 cu. ft., the cylinder wall thickness is a minimum of one quarter inch thick, the primary cylindrical cell part is fastened to the base part by wing nuts and fixing arms during the soil compaction process, the second of the three parts that make up the rigid cylindrical soil testing cell is a cylindrical sleeve, which is 2.0 inches in length that is known as the top sleeve, and has an inside diameter of 6.0 inches and a cut-away connection notch such that the top cylinder part fits over the primary cylinder part by five eighths of an inch (5/8"), and is fastened to the primary cell part and to the base part by wing nuts and fixing arms during the soil compaction process, and the top cylinder part is removed form the primary cylinder part and the soil is leveled off at the top of the cell so that the standard volume of the cell without the top sleeve on it is 1/13.333 (1/30) of a cubic foot, plus or minus 0.0009 cu. ft., the third part of the cylindrical soil testing cell is the base, the base is a flat insulator material that is eleven inches by eleven inches by one inch, and has two six inch long by 3/8 inch diameter bolts extending up perpendicular from the base part, a cylindrical notch is located in the center of the base part that is one sixteenth of and inch larger than the outside diameter of the primary cylindrical cell part and is one eight of an inch deep, the bolts are located 180 degrees apart on the base at a center-to-center distance of eight inches and the bolts are permanently fixed to the base so that the bottom of the base is flat and the bolts extend up from the tip of the base six inches, and the primary cylindrical cell fits between the bolts and in the cylindrical notch, and the bolts along with wing-nuts and fastening arms on the primary cylindrical cell part are used to fasten both the primary cylindrical part and the cylindrical sleeve to the base part during compaction testing, the electrodes are one eighth inch (1/8") in diameter and are located in the base part along a line that constitutes a diameter line across the cylindrical notch in the base part and each electrode is 1.181 inches apart such that center of the Wenner array is incident with the center of the primary cylindrical cell part when the primary cylindrical cell part is fixed to the base, the electrodes are manufactured into the base part so the each electrode is flush with the flat surface of the cylindrical notch in the base part, the base part has a cut-out notch in the bottom that is in the center of the base part and is five inches in diameter and one half inch deep, the Wenner array electrodes extend into the notch such that electrical connectors can be attached to the electrodes.

* * * * *